United States Patent Office 3,824,161
Patented July 16, 1974

3,824,161
METHOD OF SEPARATING METALLIC CHLO-
RIDES FROM AN AQUEOUS MIXTURE THEREOF
Alexander I. Aue, Gullspang, Hans Reinhardt and Jan
Helge Arnold Rydberg, Vastra Frolunda, and Lars
Skjutare, Gullspang, Sweden, assignors to Gullspangs
Elektrokemiska AB, Gullspang, Sweden
Filed Oct. 8, 1971, Ser. No. 187,845
Claims priority, application Sweden, Oct. 8, 1970,
13,640/70
Int. Cl. B01d 11/00; C01g 49/10, 51/08
U.S. Cl. 423—139
6 Claims

ABSTRACT OF THE DISCLOSURE

A method for separating one or more metallic chlorides from an acid aqueous mixture thereof, by a multi-stage, selective extraction process with a water immiscible extraction agent consisting of a solution of an amine capable of forming extractable compounds with the metallic chlorides, and subsequently washing out the metallic chloride or chlorides.

---

Such processes have previously been described in the art (see inter alias U.S. Pat. No. 3,446,720). The U.S. patent describes a process for separating iron chloride from an aqueous mixture of the iron chloride with, in particular, cobalt and nickel cholrides, by means of a multi-stage extraction process, the extraction agent in the first step being a solution of a secondary amine for separating the iron cholride (ferric chloride) and a solution of a tertiary amine in an oleophilic solvent being used in a second step to separate cobalt chloride from a mixture of the cobalt chloride and nickel chloride.

Figure 1:
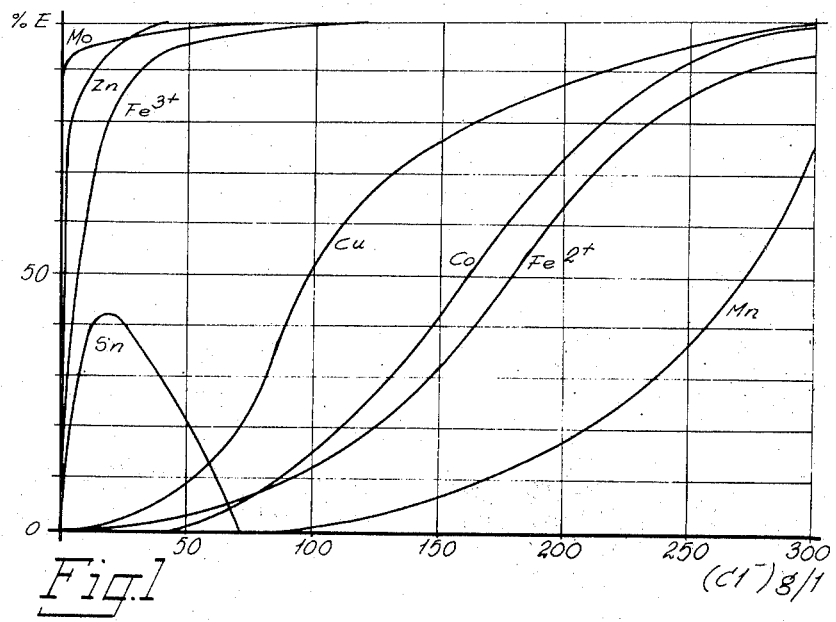

For an extraction agent containing the same type of amines, e.g. tertiary amines, it has been discovered that the distribution factor for a metallic chloride between the extraction agent phase and the aqueous acid phase is substantially a function of the chloride ion concentration in the aqueous phase. The conditions can be illustrated by means of the accompanying diagram in FIG. 1, which shows the percentage of metallic cholride extracted from an aqueous phase when using an extracting agent consisting of a solution of 25% triisooctylamine and 15% dodecyl alcohol in 60% kerosene as a solvent, as a function of the chloride ion concentration in grams per liter. It will be seen from the diagram that such metallic chlorides as ferric chloride and zinc chloride pass into the extraction agent phase at low concentrations of chloride ions, while higher chloride ion concentrations are required in order, for example, for cobalt chloride to obtain a high distribution factor between the extraction agent phase and the aqueous phase. It is also evident from the diagram that ferrous chloride has a low distribution factor at low chloride ion concentrations, while, on the other hand, ferric chloride has a high distribution factor at low chloride ion concentrations. Similar curves can be written for other compositions of the extraction agent. On the basis of the diagram, it has been found possible to separate metallic chlorides from an aqueous mixture thereof in a multistage extraction process, by varying the chloride ion concentration during each extraction step. This method of procedure simplifies the separation process and eliminates the disadvantage associated with the method of the aforementioned U.S. patent using different extraction agents to separate iron from cobalt and nickel and then cobalt from nickel.

The process of the present invention is mainly characterized in that the chloride ion concentration is adjusted in the first step so as not to exceed approx. 150 g./l., preferably to approx. 50-100 g./l., and is increased in the subsequent step or steps in relation to the complex building ability of the metal ions present in the aqueous mixture.

According to an advantageous embodiment of the invention, the concentration of chloride ions can be adjusted to a desired level by evaporating the mixture used in each step for extraction purposes. In principle, it is also possible to adjust the concentration of chloride ions by adding, from outside the system, chloride containing compounds, for example calcium chloride. The procedure proposed according to the invention is advantageous, however, insomuch that the addition of chloride containing compounds from outside the system is obviated and thus, in this respect, the consumption of chemicals can be reduced. According to the invention the vapor obtained in each stage by evaporating the metallic chloride containing solutions can be used in the form of a condensate for washing out (eluting) the metallic chloride or metallic chlorides and for diluting the metallic cholride solution obtained in the washing out process. Thus, in this way the advantage is obtained whereby the process can be carried out as a continuous process of circulation in a closed system, thereby avoiding the discharge of harmful effluent.

According to a very advantageous embodiment of the invention, the aqueous mixture of metallic chloride or chlorides is obtained by the anodic dissolution of an alloy containing metals of the metallic chloride or chlorides in elemental form. Examples of starting materials suitable for use in the present invention include so-called super alloys, i.e. iron alloys presenting up to 20–30% iron mixed with other metals, such as cobalt, nickel etc. The starting material may be in the form of scrap, grindings etc. In principle it is also possible to process other chloride containing solutions obtained, for example, by leaching metal-containing ore materials which have been subjected to chlorinating roasting processes.

According to the invention, the anodic dissolution process can be combined with cathodic precipitation of a metal or a metal alloy in the same electrolysis cell having a diaphragm located between the anode and the cathode chambers.

In accordance with a further embodiment of the invention the aqueous solution of metal chloride or chlorides obtained by washing (eluting) subsequent to each extraction step can be passed to the cathode chamber in an electrolysis cell which operates in a manner such that an alloy is simultaneously anodically dissolved, for cathodically precipitating out the metal of the metallic chloride.

According to another embodiment of the invention, the alloy to be anodically dissolved may contain iron, so that the solution obtained by the dissolution process contains ferrous chloride. In this context, the solution can be oxidized for the purpose of converting the ferrous chloride to ferric chloride, whereupon the ferric chloride can be extracted and washed in a manner to provide a pure solution of ferric chloride. In accordance with the invention, the pure solution of ferric chloride can be subjected to a reduction process in a manner to produce a pure solution of ferrous chloride, which can then be charged to the cathode chamber in one or more electrolysis cells operating with diaphragms and simultaneous anodic dissolution.

According to the invention, the solution obtained from the anodic dissolution process can be treated, for oxidation of the ferrous chloride present therein, electrolytically in the anode chamber of an electrolysis cell, in the cathode chamber of which a pure solution of ferric chloride obtained by an extraction process is simultaneously treated for reduction of the ferric chloride to ferrous chloride prior to the cathodic precipitation process. Reduction of the ferric chloride can also take place purely chemically at the same time as it is washed out.

od of the invention into effect, the illustrated system com-

Figure 2:
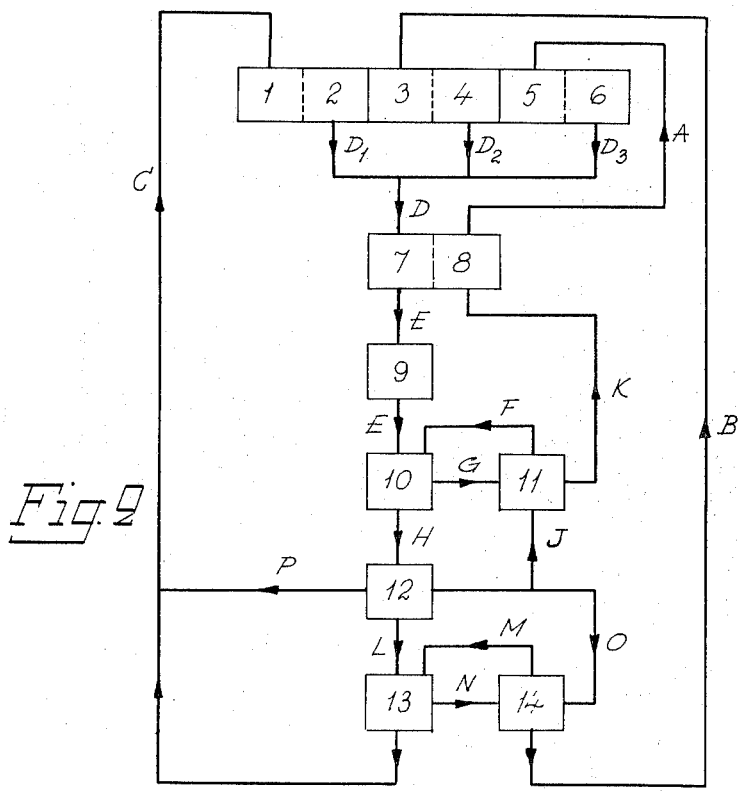

FIG. 2 is a flow sheet of a system for putting the method of the invention into effect, the illustrated system comprising a number of electrolysis cells in which the cathode chamber and the anode chamber are separated by a diaphragm. The system is adapted to process scrap material comprising an alloy of iron, cobalt and nickel as the main constituents, with minor quantities of other metals such as molybdenum, tungsten and chromium. The illustrated electrolysis system is divided into three cell sections, the cathode chambers 1 of the cells of the first section receiving nickel chloride (nickelous chloride) solution C, the cathode chamber 3 of the cells of the second section receiving a cobalt (cobaltous) chloride solution B and the cathode chamber 5 of the cells of the third section receiving a ferrous chloride solution A. The anode chambers of respective cells are designated 2, 4 and 6. The metals nickel, cobalt, iron and, to a certain extent, chromium are dissolved from a corresponding alloy, e.g. a so-called super alloy, at the anode of each cell.

Molybdenum, tungsten and chromium are enriched in the anode residue.

The alloy intended for anodic dissolution can be pretreated pyrometallurgically, for example, in accordance with proposals put forward in Swedish patent . . . (Swedish Pat. Appln. No. 16,823/68 available to the public). The process described therein is based on the melting of scrap, a certain degree of slagging taking place together with a high degree of carburization. During the carburization of the material, the difficultly meltable metals molybdenum, tungsten and, to a certain extent, chromium form carbides, while the metals nickel, cobalt and iron of the iron group have but a slight tendency to form carbides.

The solutions leaving the anode chambers are illustrated in FIG. 2 by the references $D_1$, $D_2$ and $D_3$. They are combined into a common stream D which is passed into an anode chamber 7 associated with an electrolysis cell for the oxidation of ferrous chloride present in the stream to ferric chloride, the nickel chloride and cobalt chloride remaining unaffected. Subsequent to being treated in the electrolysis cell for the oxidation of the ferrous chloride to ferric chloride, the solution E passes from the anode chamber of the electrolysis cell through a filter 9 for removing solid material. Subsequent to being filtered, the solution passes into a separation system, in which its metallic chloride mixture is separated into the respective constituents of the mixture, i.e. ferric chloride, cobalt chloride and nickel chloride.

Each separation step comprises two phases, the solution to be treated for separation being treated in the first phase with an extraction agent consisting of a solution of 25% triisooctylamine and 15% dodecyl alcohol in 60% kerosene, while in the second phase the obtained extract is washed or eluted by adding an aqueous liquid thereto. The first separation step includes the separation of ferric chloride from a solution E of the metallic chlorides. For this purpose, the chloride ion concentration in the solution is adjusted to a relatively low level, approx. 75 g./l., at a temperature of 40° C. The solution is treated with the extraction agent in an extractor 10 in three stages, iron being removed practically quantitatively from the solution. The obtained extract, designated G in the Figure, is then passed to a washing station 11 and the refined extract H is passed to an evaporator 12, in which the refined extract is evaporated to increase the chloride iron concentration to approx. 300 g./l. A portion J of the condensate obtained in the vaporiser is passed to the washing station 11. When washing the extract G, there is obtained a pure solution of ferric chloride and extraction agent. The solution of ferric chloride, designated K in the Figure, is passed to the cathode chamber 8 of the electrolysis cell 7–8, in which chamber it is treated for reduction of the ferric chloride to ferrous chloride. The formed solution of ferrous chloride A is passed to the cathode chamber 5 in the department of electrolysis cells in which the metal is precipitated out cathodically in the form of pure iron. The recovered extraction agent F is passed to the extractor 10, where it is mixed with a new solution of metallic chlorides E.

The solution, designated L in the Figure, obtained from the vaporiser 12 and containing cobalt chloride and nickel chloride and having an increased content of chloride ions (300 g./l.), is then passed to a six stage extractor 13 for separating cobalt chloride, the solution being treated with the same extraction agent as that used in the preceding extraction process to form an extract N which is passed to an associated washing means 14. The extract N is treated in the washing means 14 with acid condensed water O from the vaporiser 12 in a manner to form a relatively concentrated solution B of cobalt chloride, which is passed back to the cathode chamber 3 for the precipitation of cobalt on the cathode of the electrolysis cell. The liberated extraction agent M is used for renewed extraction treatment of the solution L of cobalt chloride and nickel chloride, while the refined solution, which is now a relatively pure solution of nickel chloride C, is returned to the process to the cathode chamber 1 in the electrolysis cell for precipitating out nickel metal subsequent to having been mixed with condensate P from the vaporiser 12.

As will be evident from the aforegoing, the process is closed, which means that consumption of extraction agent is very small. No problems concerning the discharge of harmful effluents arise. Furthermore, the process is extremely flexible, since it is possible to treat alloys with varying contents of ingredients. Since a plurality of electrolysis cells are used, it is relatively easy to divide the work carried out by said cells in relation to the volume of each of the obtained solutions of separated metals in chloride form. Moreover, because it is generally only necessary to determine the quantity of water driven off in the vaporiser 12, it is very simple to adjust the solutions for optimal yield of extracted metallic chlorides. Another advantage afforded by the present invention is that it makes it possible to work with one and the same extraction agent.

What we claim is:

1. In the known method of separating an aqueous chloride solution containing ferric chloride, nickel chloride and cobalt chloride into separate chloride solutions wherein in a first extracting step said aqueous chloride solution is contacted with an extracting agent to form an iron-containing extract, stripping the iron from iron-containing extract with water, treating the remaining portion of said aqueous chloride solution that contains nickel chloride and cobalt chloride in a second extracting step with an extracting agent to form a cobalt-containing extract, and stripping the cobalt from said second extract with water, the improvement which comprises:

(a) using as the extracting agent in both said first and second extracting steps, under acid conditions, a water-immiscible mixture of dodecyl alcohol, kerosene and triisooctylamine
(b) adjusting the chloride content of said aqueous chloride solution that is subjected to said first extracting step so that it contains approximately 50–100 grams per liter of chloride, and
(c) increasing the chloride ion concentration in the second extraction step to approximately 300 grams per liter of chloride.

2. A method according to Claim 1 wherein the chloride ion concentration in the second extraction step is adjusted to the stated level by concentration by vaporization.

3. A method according to Claim 1 wherein the vapor obtained during the vaporization step is used in the form of a condensate for stripping the metallic chlorides from the extracting agent.

4. A method according to Claim 1 wherein said extracting agent consists of 25% triisoctylamine, 15% dodecyl alcohol and 60% kerosene.

5. A process for individually separating, under acid conditions, ferric chloride, cobalt chloride and nickel chloride from an aqueous solution containing these chlorides, comprising:

(a) adjusting the chloride content of said aqueous solution so that said solution contains approximately 50-100 grams per liter of chlorides at an acid pH-value;
(b) contacting said solution with a water-immiscible extractant mixture of dodecyl alcohol, kerosene and triisooctylamine to form a first extract phase containing all of the iron originally present in the aqueous solution, and a first raffinate phase containing almost all said nickel and cobalt in said solution,
(c) separating the aforesaid phases from one another, and
(d) adjusting the chloride content of the raffinate phase to a value approximately 300 grams of chloride per liter,
(e) contacting said raffinate phase consisting of an aqueous solution of cobalt and nickel with the same water-immiscible extractant to form a second extract phase containing almost all of the cobalt of the first raffinate phase and a second raffinate phase containing all nickel of the original solution, and
(f) separating said escond extract phase and said second raffinate phase from each other.

6. A process as claimed in Claim 5 wherein said adjustment is carried out by evaporation of water.

References Cited

UNITED STATES PATENTS

| 3,446,720 | 5/1969 | Brooks | 204—112 |
|---|---|---|---|
| 3,607,236 | 9/1971 | Brooks et al. | 423—139 |

FOREIGN PATENTS

| 791,612 | 8/1968 | Canada | 423—139 |

F. C. EDMUNDSON, Primary Examiner

U.S. Cl. X.R.

204—94